(12) United States Patent
Zhou et al.

(10) Patent No.: US 10,042,502 B2
(45) Date of Patent: Aug. 7, 2018

(54) ARRAY SUBSTRATE

(71) Applicants: SHANGHAI TIANMA MICRO-ELECTRONICS CO., LTD., Shanghai (CN); TIANMA MICRO-ELECTRONICS CO., LTD., Shenzhen (CN)

(72) Inventors: Xingyao Zhou, Shanghai (CN); Qijun Yao, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

(*) Notice: Subject to any disclaimer, the term of this patent is extended or adjusted under 35 U.S.C. 154(b) by 0 days.

(21) Appl. No.: 15/904,317

(22) Filed: Feb. 24, 2018

(65) Prior Publication Data

US 2018/0181236 A1 Jun. 28, 2018

Related U.S. Application Data

(63) Continuation of application No. 15/175,580, filed on Jun. 7, 2016, now Pat. No. 9,939,977.

(30) Foreign Application Priority Data

Feb. 2, 2016 (CN) .......................... 2016 1 0074294

(51) Int. Cl.
*G06F 3/041* (2006.01)
*G06F 3/044* (2006.01)

(52) U.S. Cl.
CPC .... *G06F 3/044* (2013.01); *G06F 2203/04103* (2013.01)

(58) Field of Classification Search
CPC ....... G06F 2203/04103; G06F 3/03547; G06F 3/044
USPC .................................................. 345/173–178
See application file for complete search history.

(56) References Cited

U.S. PATENT DOCUMENTS

| 2014/0160066 A1* | 6/2014 | Kim | G06F 3/0412 345/174 |
| 2015/0145821 A1* | 5/2015 | Kim | G06F 3/0412 345/174 |
| 2016/0048267 A1* | 2/2016 | Lee | G06F 3/0418 345/173 |

(Continued)

*Primary Examiner* — Roy P Rabindranath
(74) *Attorney, Agent, or Firm* — Kilpatrick Townsend & Stockton LLP

(57) ABSTRACT

The present disclosure provides an array substrate, the array substrate includes: a substrate, a first insulation layer disposed above the substrate, a plurality of touch lines disposed at the bottom of the first through-hole, a plurality of touch electrode blocks disposed above the first insulation layer, a pixel connection portion disposed at the bottom of the first through-hole, a plurality of pixel electrodes disposed above the first insulation layer. The first insulation layer consists of at least one first through-hole running through the first insulation layer. At least one of the plurality of touch lines corresponds to one touch electrode block, and the touch electrode block is electrically connected to the corresponding at least one touch line. The pixel electrode is electrically connected to the pixel connection portion. In the present disclosure, the touch lines and the pixel connection share one through-hole.

9 Claims, 16 Drawing Sheets

(56) References Cited

U.S. PATENT DOCUMENTS

2016/0188040 A1\* 6/2016 Shin ........................ G06F 3/047
345/174

\* cited by examiner

ARRAY SUBSTRATE

CROSS-REFERENCES TO RELATED APPLICATIONS

The present application is a continuation application of U.S. patent application Ser. No. 15/175,580, filed on Jun. 7, 2016, which claims priority to Chinese Application No. CN201610074294.1 filed on Feb. 2, 2016, which are herein incorporated by reference in their entireties.

TECHNICAL FIELD

The present application relates to the field of display technologies, in particular to an array substrate.

BACKGROUND

With thinner and lighter tendency of structures of display panels, it has become a major development tendency for integration of touch parts with a liquid crystal panel in the current display panels. The integration design for the touch parts and the liquid crystal display panel includes an "In-cell" mode and an "On-cell" mode. The display panel generally includes an array substrate and a color filter substrate. In the display panel with the In-cell mode, the touch parts are integrated inside the array substrate or the color filter substrate.

FIG. 1A is a schematic view showing an array substrate of an In-cell display panel according to the related art. FIG. 1B is a section view of FIG. 1A taken along line A-A'. As shown in FIGS. 1A and 1B, the array substrate includes: a substrate 10, a source electrode 11 and a drain electrode 12 on the substrate 10, an organic film layer 13, a touch line 14, a first insulation layer 15, a plurality of common electrode blocks 16, a second insulation layer 17 and a pixel electrode 18. The plurality of common blocks 16 are arranged in an matrix manner and are multiplexed as a touch electrode. The touch lines 14 are arranged to correspond to the common electrodes 16, respectively, and are electrically connected to the common electrodes 16 through the first through-holes 19. The pixel electrode 18 is electrically connected to the drain electrode 12 through a second through-hole 20. The source electrode 11 is electrically connected to a data line 21.

It can be seen from FIGS. 1A and 1B that the array substrate at least includes a first through-hole 19 for conducting the touch line 14 with the common electrode block 16 and a second through-hole 20 for conducting the pixel electrode 18 with the drain electrode 12. In a liquid crystal display panel, the alignment of the liquid crystal molecules in the vicinity of the through-holes is relatively disordered, and hence it is generally to arrange a black matrix to shield the liquid crystal molecules. As a result, more numbers of the through-holes cause a larger area of disordered region of the alignment of the liquid crystal molecules, so that the a larger area of the corresponding black matrix causes a reduced dimension of the pixel display region, thereby decreasing the aperture rate of the pixel.

In addition, the touch line 14 is extended below a corresponding column of common electrode blocks 16 and is electrically connected to the corresponding common electrode block 16 in the corresponding column of common electrode blocks 16. Also, due to a small thickness of the first insulation layer 15, a large parasitic capacitance is generated between the touch line 14 and the other common electrode blocks 16 than the corresponding common electrode block 16 in the corresponding column of common electrode blocks 16.

FIG. 1C is a schematic view showing another array substrate of an in-cell display panel according to the related art. FIG. 1D is a section view of FIG. 1C taken along line B-B'. Reference numerical of FIGS. 1A and 1B are used herein. The touch line 14 is staggered from the data line 21, but the problem that a larger parasitic capacitance is generated between the touch line 14 and the common electrode block 16 is still existed.

Similarly, the array substrate at least includes a first through-hole 19 for conducting the touch line 14 with the common electrode block 16 and a second through-hole 20 for conducting the pixel electrode 18 with the drain electrode 12. In a liquid crystal display panel, the alignment of the liquid crystal molecules in the vicinity of the through-holes is relatively disordered. It is generally to arrange a black matrix to shield the liquid crystal molecules. As a result, the more the through-holes are, the larger the disordered region of the alignment of the liquid crystal molecules are, and accordingly, the black matrix also has a relatively large dimension, thereby decreasing the display region of the pixel and then decreasing the aperture rate of the pixel.

SUMMARY

Embodiments of the present disclosure provide an array substrate to solve the problem in the related art that the aperture rate is small.

In a first aspect, embodiments provide an array substrate, including: a substrate, a first insulation layer disposed above the substrate, a plurality of touch lines disposed at the bottom of the first through-hole, a plurality of touch electrode blocks disposed above the first insulation layer, a pixel connection portion disposed at the bottom of the first through-hole, and a plurality of pixel electrodes disposed above the first insulation layer. The first insulation layer consists of at least one first through-hole therein, and the at least one first through-hole running through the first insulation layer. At least one of the plurality of touch lines corresponding to one touch electrode block such that the at least one touch line is electrically connected to the corresponding touch electrode block. A pixel connection portion disposed at the bottom of the first through-hole, and the pixel connection portion is insulated from the touch lines. The pixel electrode is electrically connected to the pixel connection portion.

In a second aspect, embodiments provide an array substrate such that the array substrate includes: a substrate, a first insulation layer disposed above the substrate, a plurality of touch connection portions disposed at the bottom of the first through-hole, a plurality of touch electrode blocks disposed above the first insulation layer, a drain electrode disposed at the bottom of the first through-hole, and a plurality of pixel electrodes disposed above the first insulation layer. The first insulation layer consists of at least one first through-hole therein, and the at least one first through-hole runs through the first insulation layer. At least one of the plurality of touch lines corresponding to one touch electrode block such that the at least one touch line is electrically connected to the corresponding touch electrode block. The drain electrode is insulated from the touch connection portion. The pixel electrode is electrically connected to the drain electrode.

In a third aspect, an array substrate is provided such that the array substrate includes: a substrate, a first insulation layer disposed above the substrate, a plurality of touch lines disposed at the bottom of the first through-hole, a plurality of touch electrode blocks disposed above the first insulation layer, a drain electrode disposed at the bottom of the first through-hole, a plurality of pixel electrodes disposed above the first insulation layer. The first insulation layer consists of at least one first through-hole therein, and the at least one first through-hole runs through the first insulation layer. At least one of the plurality of touch lines corresponding to one touch electrode block such that the at least one touch line is electrically connected to the corresponding touch electrode block. The drain electrode is insulated from the touch lines. A plurality of pixel electrodes disposed above the first insulation layer, and the pixel electrode is electrically connected to the drain electrode.

According to various embodiments, the first insulation layer consists of a first through-hole, the touch lines and the pixel connection portion are arranged at the bottom of the first through-hole. The touch electrode blocks are electrically connected to the corresponding touch lines through the first through-hole, and the pixel electrodes are electrically connected to the pixel connection portion through the first through-hole. As a result, only one through-hole may be required for realizing the electrical connection between the touch electrode blocks and the touch lines and between the pixel electrodes and the pixel connection portion. That is, only one through-hole is commonly shared by the touch lines and the pixel connection portion. However, it should be understood that some embodiments may consist of more than one through-hole. As compared with the prior art, the number of the through-holes and the apertures of the through-holes are both reduced in the present disclosure. The alignment disordered region of the liquid crystal molecules caused by the through-hole is decreased, and hence the corresponding dimension of the black matrix is decreased, thereby increasing the aperture rate of the pixel.

DESCRIPTION OF DRAWINGS

Embodiments of the present disclosure will become more clearly by referring to the detailed description to the non-limited embodiments made by the following drawings.

DETAILED DESCRIPTION OF THE EMBODIMENTS

The present disclosure will be described below in detail in conjunction with the accompanying drawings and specific embodiments. It is appreciated that the specific embodiments described herein are only used for explaining the present disclosure, but not limiting the present invention. Also, for the convenience of description, the accompanying drawings illustrate only the relevant parts of the present invention not all contents thereof.

Figure 1A:
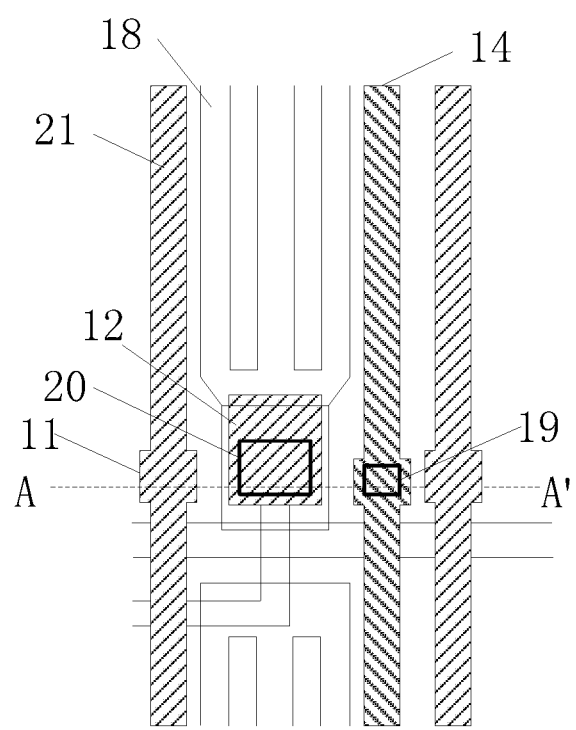
FIG. 1A is a schematic view showing an array substrate of an in-cell display panel according to the related art.
Figure 1B:
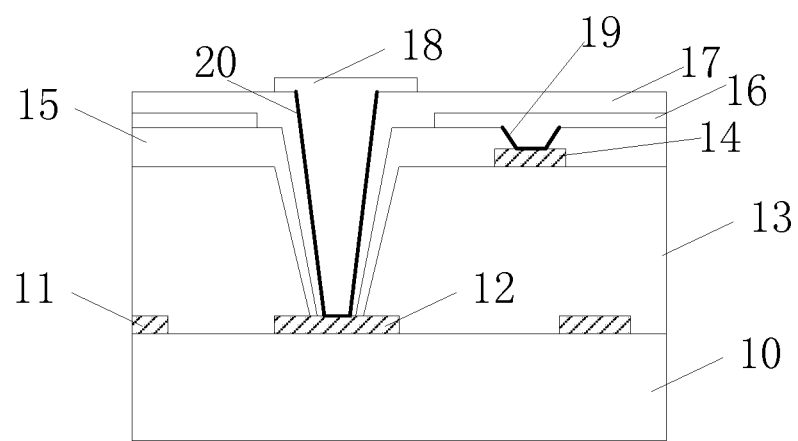
FIG. 1B is a section view of FIG. 1A taken along line A-A'.
Figure 1C:
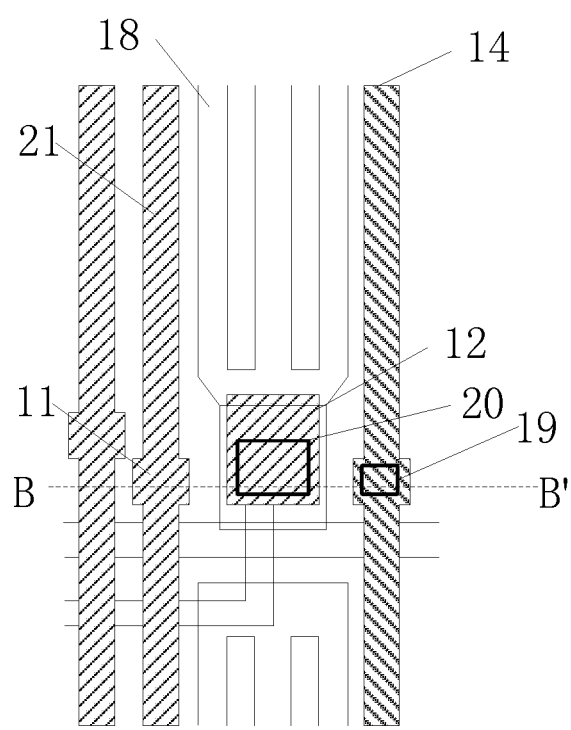
FIG. 1C is a schematic view showing another array substrate of an in-cell display panel according to the related art.
Figure 1D:
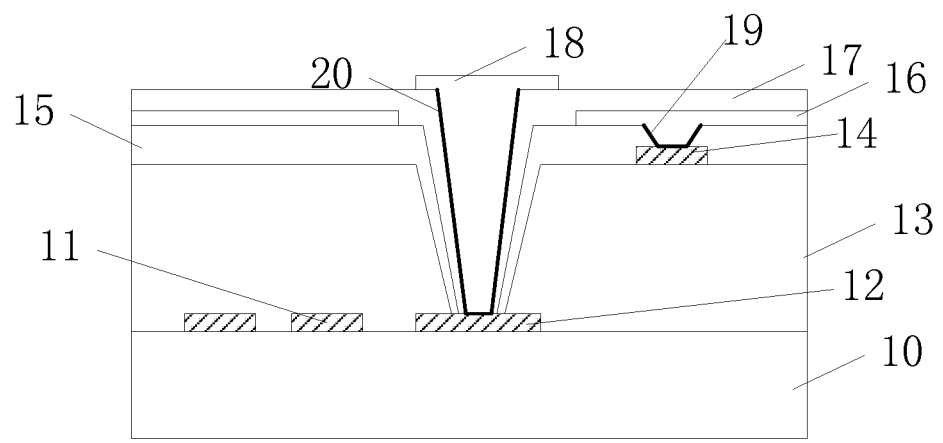
FIG. 1D is a section view of FIG. 1C taken along line B-B'.
Figure 2A:
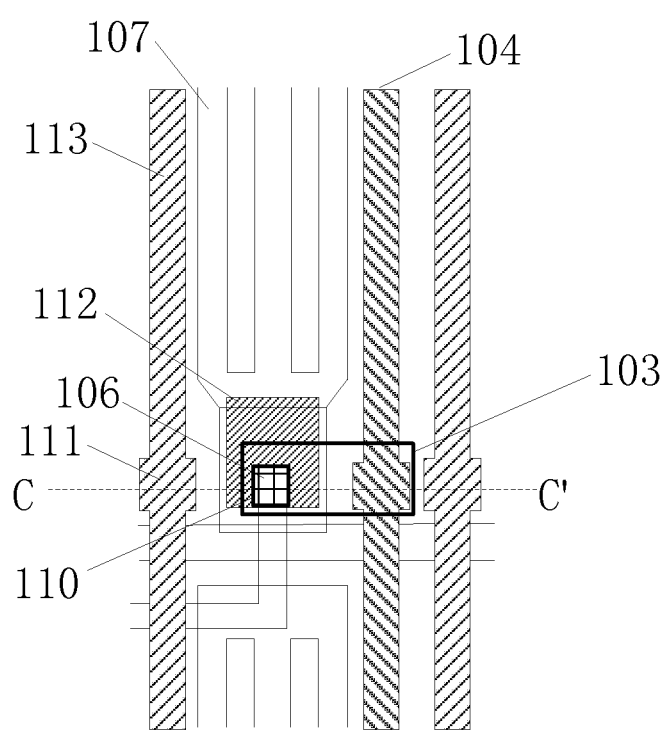
FIG. 2A is a schematic view of an array substrate according to an embodiment of the present disclosure.
Figure 2B:
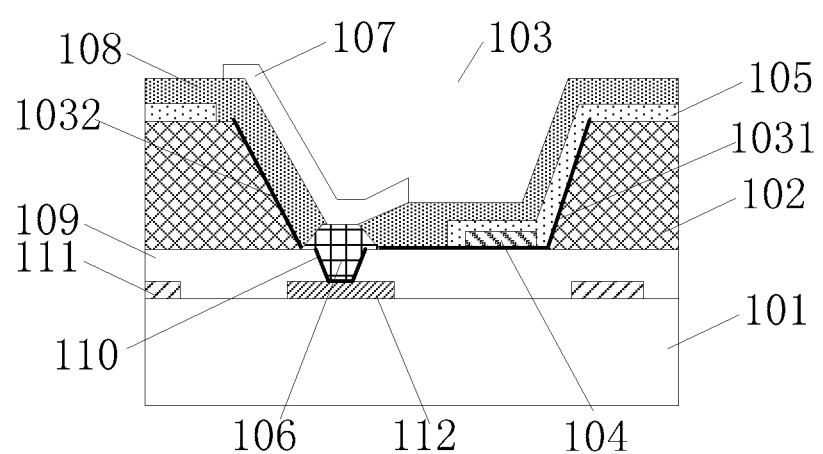
FIG. 2B is a section view of FIG. 2A taken along line C-C'.

In order to solve the problem in the related art, as shown in FIG. 2A, an embodiment of the present disclosure provides an array substrate, FIG. 2B is a section view of FIG. 2A taken along line C-C', in the present embodiment, the aperture rate of the pixel can be improved.

As shown in FIGS. 2A and 2B, the array substrate provided in the present embodiment includes: a substrate 101; a first insulation layer 102 above the substrate 101, a plurality of touch lines 104 disposed at the bottom of the first through-hole 103, a pixel connection portion 106 disposed at the bottom of the first through-hole 103, and a plurality of pixel electrodes 107 disposed above the first insulation layer 102.

The first insulation layer 102 consists of at least one first through-hole 103 therein, and the at least one first through-hole 103 runs through the first insulation layer 102. At least one of the plurality of touch lines 104 corresponds to one touch electrode block 105, and the touch electrode block 105 is electrically connected to the corresponding at least one touch line 104. The pixel connection portion 106 is insulated from the touch line 104. The pixel electrode 107 is electrically connected to the pixel connection portion 106.

In this embodiment, the substrate 101 is a glass substrate, and the first insulation layer 102 is an organic film layer. However, the materials of the substrate 101 and the first insulation layer 102 are not intended to limited to those materials. The first insulation layer 102 consists of at least one the first through-hole 103 therein. In this embodiment, only one first through-hole 103 in the first insulation layer 102 is illustrated in the drawings.

A plurality of touch lines 104 are provided at the bottom of the first through-hole 103 and a plurality of touch electrode blocks 105 are provided above the first insulation layer 102. In this embodiment, the plurality of touch electrode blocks 105 are arranged in a matrix manner. Each of the touch electrode blocks 105 is electrically connected to the corresponding at least one touch line 104 through the first through-hole 103. The touch line 104 is used to provide touch signals to the corresponding touch electrode block 105. The plurality of touch lines 104 are extended below a column of touch electrode blocks 105. Each touch electrode block 105 in the column of touch electrode blocks 105 is electrically connected to the corresponding at least one touch line 104 through the one first through-hole 103.

It should be noted that in a liquid crystal display panel, the alignment of the liquid crystal molecules in the vicinity of the through-holes is disordered, so that it is generally to arrange a black matrix to shield the liquid crystal molecules. As a result, a higher number of through-holes would cause a large area of alignment disordered region of the liquid crystal molecules, so that the dimension of the black matrix is enlarged, thereby decreasing the aperture rate of the pixel. In this embodiment, the aperture of the first through-hole 103 is less than a sum of two apertures of two through-holes. As a result, the aperture rate of the pixel in the present embodiment is larger than the aperture rate of the pixel in the related art.

A pixel connection portion 106 is disposed at the bottom of the first through-hole 103. The pixel connection portion 106 and the touch lines 104 commonly share one through-hole and the pixel connection portion 106 is insulated from the touch line 104. A plurality of pixel electrodes 107 are disposed above the first insulation layer 102. The pixel electrode 107 is electrically connected to the pixel connection portion 106 through the first through-hole 103. The pixel connection portion 106 is used as a transmission part of the pixel electrode 107, and is configured to provide display signals to the pixel electrode 107. In a process for manufacturing an array substrate, the pixel connection portion 106 is arranged in the same layer with the touch lines 104 and is formed by an etching method. In the present disclosure, the process for manufacturing the pixel connection portion 106 and the touch lines 104 in the same layer is not defined herein.

In some embodiments, the aperture of the first through-hole 103 can be varied according to different cases. When the touch electrode block 105 is needed to be electrically connected to the corresponding touch line 104, the aperture of the first through-hole 103 is large, and the pixel connection portion 106 and the corresponding touch line 104 are exposed from the bottom of the first through-hole 103. When the touch electrode blocks are not needed to be electrically connected to the touch lines, only the aperture of the first through-hole at this location is need to be decreased and only the pixel connection portion is exposed from the bottom of the first through-hole. Or at a location where the touch electrode blocks are not needed to be connected to the touch lines, the aperture of the first through-hole is not changed, and the touch lines are configured to bypass the first through-hole.

According to the array substrate provided in the present embodiment, the first insulation layer 102 consists of the first through-hole 103 therein, the touch lines 104 and the pixel connection portion 106 are disposed at the bottom of the first through-hole 103. The touch electrode blocks 105 are electrically connected to the corresponding touch lines 104 through the first through-hole 103. The pixel electrodes 107 are electrically connected to the pixel connection portion 106 through the first through-hole 103. As a result, only one through-hole may be required for realizing the electrical connection between the touch electrode blocks 105 and the touch lines 104 and between the pixel electrodes 107 and the pixel connection portion 106. That is, only one through-hole is commonly shared by the touch lines 104 and the pixel connection portion 106. As compared with the related art, the number of the through-holes and the apertures of the through-holes are both reduced in the present disclosure, so that the alignment disordered region of the liquid crystal molecules caused by the through-hole is decreased. Hence the corresponding dimension of the black matrix is decreased, thereby increasing the aperture rate of the pixel.

On the basis of the above technical solution, as shown in FIG. 2B, the touch electrode block 105 is configured to be extended to the bottom of the first through-hole 103 along a first sidewall 1031 of the first through-hole 103 and is electrically connected to the corresponding at least one touch line 104. In accordance with the present disclosure, the touch electrode block 105 is electrically connected to the corresponding the touch line 104 in such a manner that it is extended along a side of the through-hole. As result, not only the touch electrode block 105 is electrically connected to the corresponding touch line through the first through-hole 103, but also a perpendicular distance between other touch electrode blocks 105 in a touch electrode layer and the touch line is increased. As compared with the related art, the distance between the touch electrode block 105 and the touch line 104 is increased, so that a parasitic capacitance between the touch electrode block 105 and the touch line 104 is reduced.

On the basis of the above the technical solution, as shown in FIG. 2B, the array substrate includes a second insulation layer 108 disposed between the first insulation layer 102 and the pixel electrodes 107. The second insulation layer 108 is configured to cover a second sidewall 1032 of the first through-hole 103 and expose the pixel connection portion 106, and the pixel electrodes 107 is extended to the bottom of the first through-hole 103 along the second insulation layer 108 covering the second sidewall 1032 in order to electrically be connected to pixel connection portion 106.

It is known that the plurality of pixel electrodes 107 are provided above the first insulation layer 102, and the plurality of touch electrode blocks 105 are provided on the first insulation layer 102. The pixel electrodes 107 receive display signals through the pixel connection portion 106 located at the bottom of the first through-hole 103, and the touch electrode blocks 105 receive touch signals through the touch lines 104 located at the bottom of the first through-hole 103. Herein, the pixel electrodes 107 should be insulated from the touch electrode blocks 105. To this end, by arranging the second insulation layer 108 on the first insulation layer 102, it is realized that the pixel electrodes 107 are provided on the second insulation layer 108, and the touch electrodes 105 are provided on the first insulation layer 102, and the pixel electrodes 107 are insulated from the touch electrode blocks 105 through the second insulation layer 108. In the present embodiment, the second insulation layer 108 is an inorganic film layer. However, in the present embodiment, the material of the second insulation layer 108 is not defined herein.

On the basis of the above the technical solution, as shown in FIG. 2B, the second insulation layer 108 is configured to cover the touch electrode blocks 105 extending along a first sidewall 1031. When the touch lines 104 are provided at the bottom of the first through-hole 103, the touch electrode blocks 105 are extended along a first sidewall 1031 of the first through-hole 103 and are electrically connected to the corresponding touch lines 104, the touch electrode blocks 105 are insulated from the pixel electrodes 107. As a result, the second insulation layer 108 is extended along the first sidewall 1031 to the touch electrode blocks 105. In addition, when the pixel connection portion 106 and the touch lines 104 are provided at the bottom of the first through-hole 103, the pixel connection portion 106 is insulated from the touch lines 104, so that the second insulation layer 108 covers the touch electrode blocks 105 extending along the first sidewall 1031 of the first through-hole 103. The second insulation layer is configured to insulate the touch electrode blocks 105 from the pixel electrodes 107, and insulate the pixel connection portion 106 from the touch lines 104.

On the basis of the above the technical solution, as shown in FIG. 2B, the array substrate further includes: a third insulation layer 109 disposed below the touch lines 104. The third insulation layer 109 is provided with a second through-hole 110 therein. A source electrode 111 and a drain electrode 112 disposed below the third insulation layer 109 and disposed on the substrate 101. The drain electrode 112 is disposed at the bottom of the second through-hole 110. The pixel connection portion 106 is electrically connected to the drain electrode 112 through the second through-hole 110.

The array substrate includes a plurality of pixel units. The pixel unit includes a pixel electrode 107 and a thin film transistor, and the thin film transistor includes a gate electrode, a drain electrode 112 and a source electrode 111. The source electrode 111 is connected to the data lines 113 and is configured to provide display signals to the pixel electrodes 107 through the drain electrode 112. In addition, the array substrate consists of an array of thin film transistors thereon. In this embodiment, the array of the thin film transistors are arranged on the substrate 101, such as the source electrode 111 and the drain electrode 112 as shown in FIG. 2B. The third insulation layer 109 is provided above the array of the thin film transistors. In some embodiments, the third insulation layer 109 may be an inorganic insulation film layer. The third insulation layer 109 is provided with a second through-hole 110 therein, the pixel connection portion 106 is electrically connected to the drain electrode 112 through the second through-hole 112, and the pixel electrodes 107 are electrically connected to the pixel connection portion 106 through the first through-hole 103. Therefore, the pixel electrodes 107 are electrically connected to the drain electrode 112 through the pixel connection portion 106 to receive display signals through the source electrode 111.

In this embodiment, the touch lines 104 are arranged in the same layer with the pixel connection portion 106, and the pixel connection portion 106 is electrically connected to the drain electrode 112 through the second through-hole 110. As a result, the touch lines 104 and the drain electrode 112 are arranged in different layers. In addition, the source electrode 111 is arranged in the same layer with the drain electrode 112, the touch lines 104 and the drain electrode 112 are arranged in different layers, and the touch lines 104 are arranged between the drain electrode 112 and the source electrode 111.

On the basis of the above the technical solution, in the array substrate, the touch electrode blocks 105 are multiplexed as a common electrode block. In a touch period, the touch lines 104 provide touch signals to the corresponding touch electrode blocks 105. In a display period, the touch lines 104 provide display signals to the corresponding touch electrode blocks 105, the source electrode 111 provides the display signals to the pixel electrodes 107, an electrical field is generated between the touch electrode blocks 105 and the pixel electrodes 107 to control the deflection direction of liquid crystal molecules.

On the basis of the above the technical solution, as shown in FIG. 2B, the first insulation layer 102 is an organic film, and a thickness of the organic film in a direction perpendicular to the substrate 101 is larger than a thickness of the third insulation layer 109. For reducing a parasitic capacitance generated between the touch lines 104 and the touch electrode blocks 105, in this embodiment, the touch lines 104 are arranged below the organic film layer, and the organic film layer is then formed to form the first through-hole 103 so as to expose the touch lines 104 at the bottom of the first through-hole 103. In a process for forming the film layers, the inorganic film layer is relative thin, and hence the organic film layer may have a thickness larger than a thickness of the inorganic film layer. Therefore, in this embodiment, an organic film layer of which thickness is larger than the thickness of the third insulation layer 109 is arranged in a direction perpendicular to the substrate 101, so that a vertical distance between the touch electrode blocks 105 and the touch lines 104 is increased. Hence the distance between the touch lines 104 and the touch electrode blocks 105 can be increased and the parasitic capacitance can be reduced.

Figure 2C:
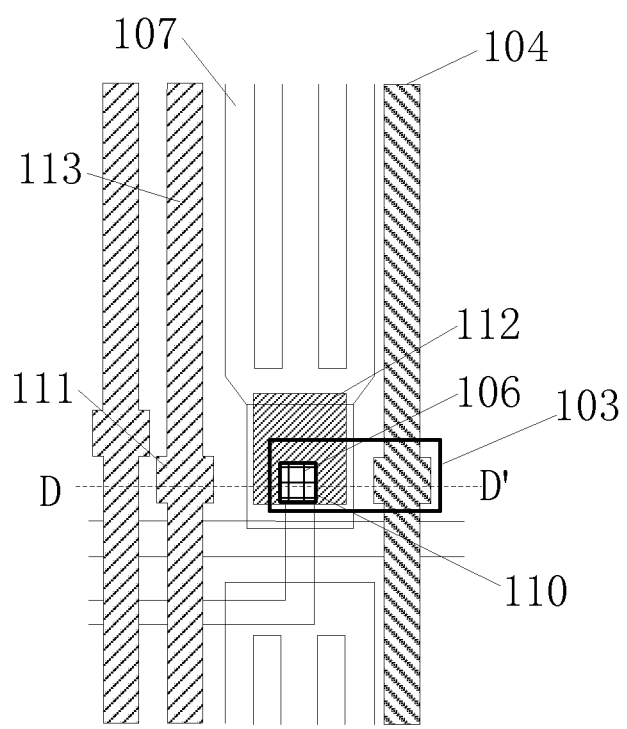
FIG. 2C is a schematic view of another array substrate according to an embodiment of the present disclosure.
Figure 2D:
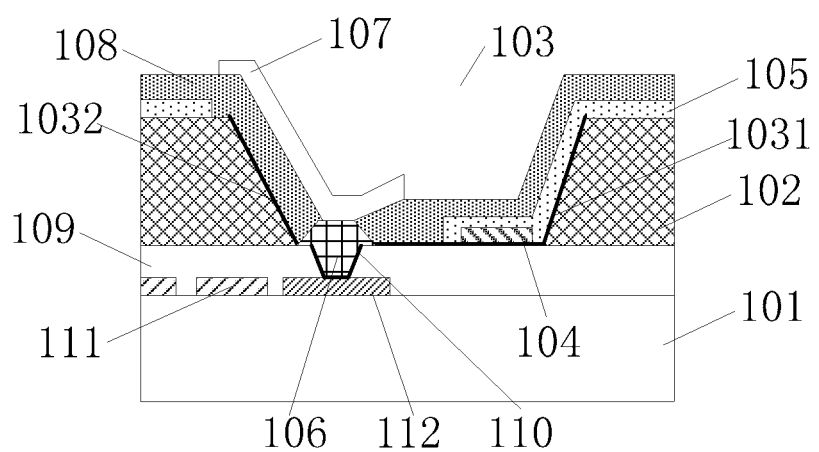
FIG. 2D is a section view of FIG. 2C taken along line D-D'.

The present embodiment also provides an array substrate as shown in FIGS. 2C to 2D. FIG. 2D is a section view of FIG. 2C taken along line D-D'. The array substrate employs an arrangement manner in which the touch lines 104 is staggered from the source electrode 111.

The source electrode 111 is arranged in a same layer with the drain electrode 112 and the source electrode 111 is located at a first side of the drain electrode 112, the touch lines 104 and the drain electrode 112 are arranged in different layers, and touch lines 104 are located at a second side of the drain electrode 112. As a result, the source electrode 111 and the touch lines 104 are arranged in different layers and the drain electrode 112 is arranged between the source electrode 111 and the touch lines 104. With such arrangement of the first through-hole 103, the aperture rate of the pixel is increased, and the principle thereof is same to the above description, which is not described in detail herein.

Figure 3A:
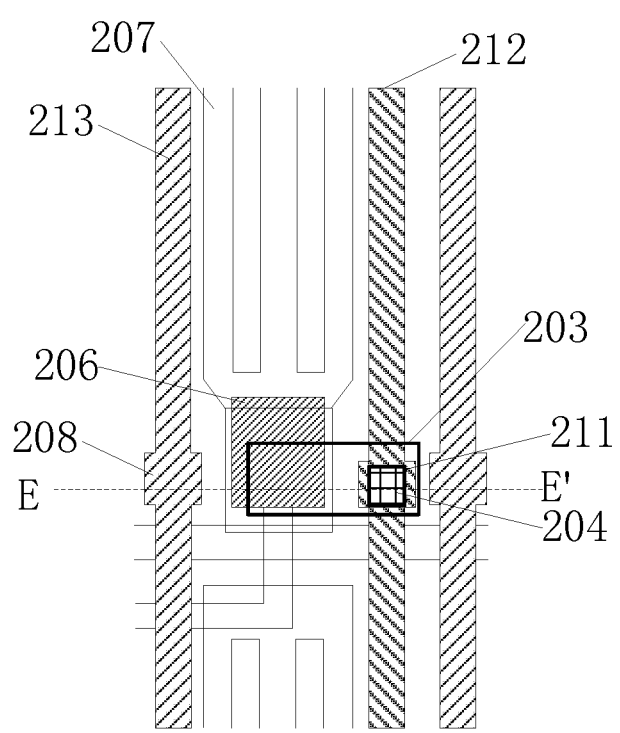
FIG. 3A is a schematic view of an array substrate according to another embodiment of the present disclosure.
Figure 3B:
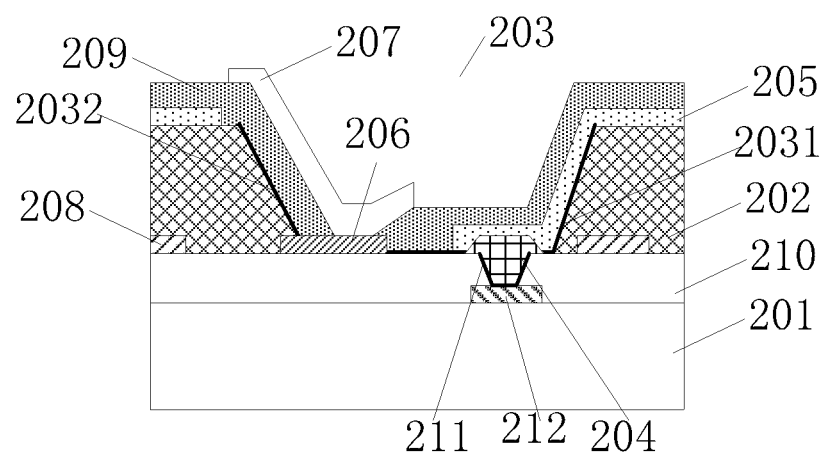
FIG. 3B is a section view of FIG. 3A taken along line E-E'.

As shown in FIG. 3A, another embodiment of the present disclosure provides an array substrate, FIG. 3B is a section view of FIG. 3A taken along line E-E'. In the present embodiment, the aperture rate of the pixel can be increased.

As shown in FIG. 3A, the present embodiment provides an array substrate, the array substrate includes: a substrate 201; a first insulation layer 202 above the substrate 201, a plurality of touch connection portions 204 disposed at the bottom of the first through-hole 203, a drain electrode 206 disposed at the bottom of the first through-hole 203, and a plurality of pixel electrodes 207 disposed above the first insulation layer 202. The first insulation layer 202 is provided with at least one first through-hole 203 therein, and the at least one first through-hole 203 runs through the first insulation layer 202. At least one of the plurality of touch connection portions 204 corresponds to one touch electrode block 205, and the touch electrode block 205 is electrically connected to the corresponding at least one touch connection portion 204. The drain electrode 206 is insulated from the touch connection portion 204. A plurality of pixel electrodes 207 disposed above the first insulation layer 202. The pixel electrode 207 is electrically connected to the drain electrode 206.

In the present embodiment, the substrate 201 is a glass substrate, and the first insulation layer 202 is an organic film layer. In the present embodiment, only one first through-hole 203 is provided in the first insulation layer 202 in the drawings.

A plurality of touch lines 204 are provided at the bottom of the first through-hole 203 and a plurality of touch electrode blocks 205 are provided on the first insulation layer 202. In this embodiment, a touch electrode layer is formed from the plurality of touch electrode blocks 205 arranged in a matrix manner. Each touch electrode block 205 is electrically connected to the corresponding touch connection portion 204 through the first through-hole 203, and the touch connection portion 204 is used to provide touch signals to the corresponding touch electrode block 205. The touch connection portion 204 has a block shape and is arranged below the corresponding touch electrode block 205. Each touch electrode block 205 is electrically connected to the corresponding at least one touch connection portion 204 through the first through-hole 203.

The drain electrode 206 is provided at the bottom of the first through-hole 203, and the drain electrode 206 and the touch connection portion 204 commonly share one through-hole and are arranged to be insulated from each other. A plurality of pixel electrodes 207 are arranged above the first insulation layer 202, and the pixel electrodes 207 are electrically connected to the drain electrode 206 through the first through-hole 203. The drain electrode 206 is used as an output terminal of the thin film transistor in the pixel unit, and is configured to provide display signals to the pixel electrodes 207. In a process for manufacturing the array substrate, the drain electrode 206 is arranged in the same layer with the touch connection portion 204 and is formed by an etching method. In the present embodiment, the process for manufacturing the drain electrode 206 and the touch connection portion 204 in the same layer is not defined herein.

It should be noted that the array substrate includes a plurality of pixel units. The pixel unit includes a pixel electrode 207 and a thin film transistor. The thin film transistor includes a gate electrode, a drain electrode 206 and a source electrode 20. The source electrode 208 is connected to data line 213 and is configured to provide display signals to the pixel electrode 207 through the drain electrode 206, and also, the array substrate is provide with an array of thin film transistors. In this embodiment, as shown in FIG. 3B, the source electrode 208 is arranged in the same layer with the drain electrode 206, and the pixel electrode 207 is electrically connected to the drain electrode 206 for receiving the display signal through the drain electrode 208 connected to the data line 213.

It is should be noted that in a liquid crystal display panel, the alignment of the liquid crystal molecules in the vicinity of the through-holes is disordered, so that it is generally to arrange a black matrix to shield the liquid crystal molecules. As a result, the more the through-holes are, the larger the disordered region of the alignment of the liquid crystal molecules are, and hence the dimension of the black matrix is enlarged, thereby decreasing the aperture rate of the pixel. In the present embodiment, the signal transmission of the pixel electrode 207 and the signal transmission of the touch electrode blocks 205 are realized by the first through-hole 203 arranged in the first insulation layer 202. As a result, the aperture of the first through-hole 203 is less than a sum of two apertures of two through-holes in the related art, and the aperture rate of the pixel in the present embodiment is larger than the aperture rate of the pixel in the related art.

In some embodiment, the aperture of the first through-hole 203 can be varied according to different cases. When the touch electrode blocks 205 are needed to be electrically connected to the corresponding touch lines 204, the aperture of the first through-hole 203 is large, and the drain electrode 206 and the touch connection portion 204 are exposed from the bottom of the first through-hole 203. When touch electrode blocks are not needed to be electrically connected to the touch connection portion, only the aperture of the first through-hole at this location is decreased and only the drain electrode is exposed from the bottom of the first through-hole. Or, at a location where the touch electrode blocks are not needed to be connected to the touch connection portion, the aperture of the first through-hole is not changed, but rather, no touch connection portion is arranged at this location during the process for manufacturing the touch connection portion, thereby not increasing manufacturing difficulty.

In the array substrate provided in the present embodiment, the first insulation layer 202 is provided with the first through-hole 203, the touch connection portion 204 and the drain electrode 206 are disposed at the bottom of the first through-hole 203, the touch electrode blocks 205 are electrically connected to the corresponding touch connection portion 204 through the first through-hole 203. The pixel electrodes 207 are electrically connected to the drain electrode 206 through the first through-hole 203. As a result, only one through-hole may be required for realizing the electrical connection between the touch electrode blocks 205 and the touch connection portion 204 and between the pixel electrodes 207 and the drain electrode 206. That is, only one through-hole 203 is commonly shared by the touch connection 204 and the drain electrode 206. As compared with the related art, the number of the through-holes and the apertures of the through-holes are both reduced in the present disclosure, so that the alignment disordered region of the liquid crystal molecules caused by the through-hole is decreased, and hence the corresponding dimension of the black matrix is decreased, thereby increasing the aperture rate of the pixel. The process for manufacturing the array in the present embodiment is the same to that in the related art, so that the difficulty for the process is not increased.

On the basis of the above the technical solution, as shown in FIG. 3B, the touch electrode block 205 is configured to extend to the bottom of the first through-hole 203 along a first sidewall 2031 of the first through-hole 203 and is electrically connected to the corresponding at least one touch connection portion 204. Herein, the touch electrode block 205 is electrically connected to the corresponding the touch connection portion 204 through the first through-hole 203 to receive touch signals. It should be noted that the touch signals received by the touch connection portion 204 are provided by the touch lines, in order to be transmitted to the corresponding touch electrode block 205. The touch connection portion 204 is arranged to be insulated from and overlapped with the touch electrode block 205. The touch lines are also arranged to be insulated from and overlapped with the touch connection portion 204. As a result, a vertical distance between the touch electrode blocs 205 in a touch electrode layer and the touch lines is increased. As compared with the related art, the distance between the touch electrode block 205 and the touch lines is increased and the touch connection portion 204 is provided between the touch electrode block 205 and the touch lines, thereby reducing the parasitic capacitance generated between the touch electrode block 205 and the touch lines.

On the basis of the above the technical solution, as shown in FIG. 3B, the array substrate includes a second insulation layer 209 disposed between the first insulation layer 202 and the pixel electrodes 207. The second insulation layer 209 is configured to cover a second sidewall 2032 of the first through-hole 203 and expose the drain electrode 206, and the pixel electrodes 207 extend to the bottom of the first through-hole 203 along the second insulation layer 209 covering the second sidewall 2032 and are electrically connected to the drain electrode 206.

The plurality of pixel electrodes 207 are provided above the first insulation layer 202, and the plurality of touch electrode blocks 205 are provided on the first insulation layer 202. The pixel electrodes 207 receive display signals through the drain electrode 206 located at the bottom of the first through-hole 203, and the touch electrode blocks 205 receive touch signals through the touch connection portion 204 located at the bottom of the bottom of the first through-hole 203. In this embodiment, the pixel electrodes 207 should be insulated from the touch electrode blocks 205. As a result, by arranging the second insulation layer 209 on the first insulation layer 202, it is realized that the pixel electrodes 207 are provided on the second insulation layer 209, and the touch electrodes 205 are provided on the first insulation layer 202, and the pixel electrodes 207 are insulated from the touch electrode blocks 205 through the second insulation layer 209. In the present embodiment, the second insulation layer 209 is an inorganic film layer. However, in the present embodiment, the material of the second insulation layer 209 is not defined herein.

On the basis of the above the technical solution, as shown in FIG. 3B, the second insulation layer 209 is configured to cover the touch electrode blocks 205 extending along a first sidewall 2031. When the drain electrode 206 and the touch connection portion 204 are provided at the bottom of the first through-hole 203, the drain electrode 206 is insulated from the touch connection portion 204. As a result, the second insulation layer 209 covers the touch electrode blocks 205 extending along the first sidewall 2031 of the first through-hole 203 such that the drain electrode 206 is insulated from the touch connection portion 204.

On the basis of the above the technical solution, as shown in FIG. 3B, the array substrate further includes: a third insulation layer 210 disposed below the drain electrode, where the third insulation layer 210 is provided with a second through-hole 211 therein. At least one touch line 212 disposed below the third insulation layer 210 and disposed on the substrate 201, where the at least one touch line 212 is disposed at the bottom of the second through-hole 211; the touch connection portion 204 is electrically connected to the touch lines 212 through the second through-hole 211.

In this embodiment, the third insulation layer 210 is an inorganic insulation film layer. In the present embodiment, the touch connection portion 204 is arranged in the same layer with the drain electrode 206, the touch lines 212 are electrically connected to the touch connection portion 204 through the second through-hole 211 for receiving touch display signals. As a result, the touch lines 212 are not arranged in the same layer with the drain electrode 206.

On the basis of the above the technical solution, as shown in FIG. 3B, in the array substrate, the touch electrode blocks 205 are multiplexed as a common electrode block. In a touch period, the touch lines 212 provide touch signals to the corresponding touch electrode blocks 205 through the touch connection portion 204. In a display period, the touch lines 212 provide display signals to the corresponding touch electrode blocks 205 through the touch connection portion 204, the source electrode 208 provides the display signals to the pixel electrodes 207, and an electrical field is generated between the touch electrode blocks 205 and the pixel electrodes 207 to control the deflection direction of the liquid crystal molecules.

On the basis of the above the technical solution, as shown in FIG. 3B, the first insulation layer 202 is an organic film layer, a thickness of the organic film in a direction perpendicular to the substrate 201 is larger than a thickness of the third insulation layer 210. In the present embodiment, the touch lines 212 are arranged at the bottom of the second through-hole 211 in the third insulation layer 210 so that the touch lines 212 is electrically connected to the corresponding touch electrode blocks 205 through the touch connection portion 204.

In a process forming the film layers, the inorganic film layer is thin, and the organic film layer may have a thickness larger than a thickness of the inorganic film layer. As a result, In the present embodiment, an organic film layer whose thickness is larger than a thickness of the third insulation layer 210 is arranged in a direction perpendicular to the substrate 201, so that the vertical distance between the touch electrode blocks 205 in a touch electrode layer at a location where the touch electrode block 205 is not electrically connected to the touch lines and the touch lines 104 is enlarged. As a result, the parasitic capacitance generated between the touch lines 212 and the touch electrode blocks 205 can be reduced.

Figure 3C:
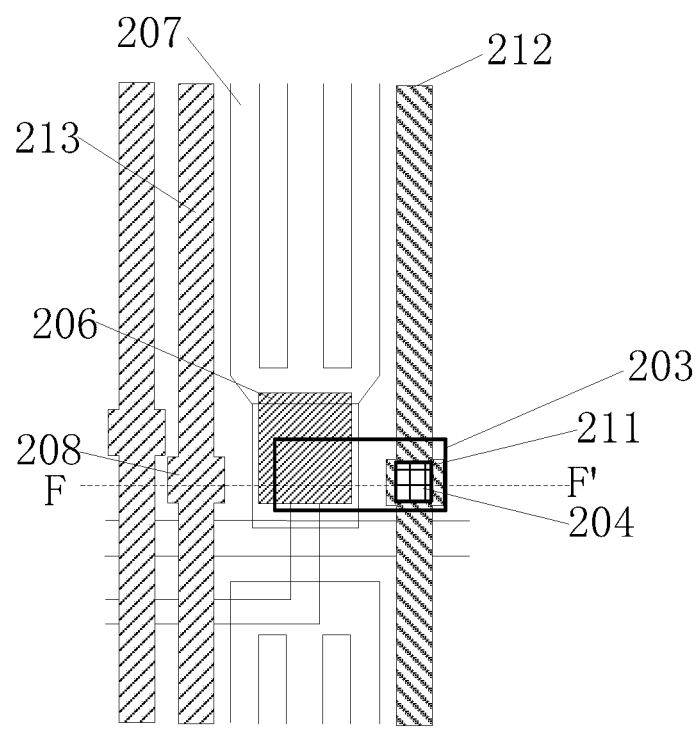
FIG. 3C is a schematic view of another array substrate according to another embodiment of the present disclosure.
Figure 3D:
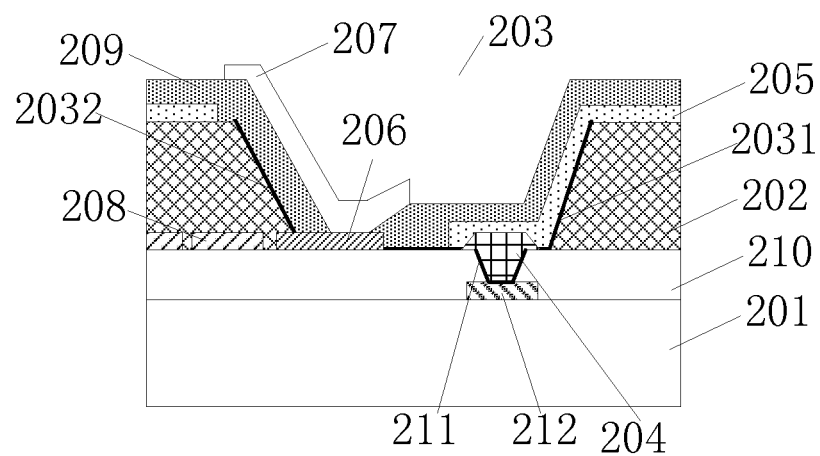
FIG. 3D is a section view of FIG. 3C taken along line F-F'.

This embodiment also provides an array substrate as shown in FIGS. 3C to 3D. Where FIG. 3D is a section view of FIG. 3C taken along line F-F'. The array substrate employs an arrangement manner in which the touch lines 212 are staggered from the source electrode 208.

The source electrode 208 is not arranged in the same layer with the touch lines 212, and a drain electrode 206 is arranged between the source electrode 208 and the touch lines 212. The arrangement of the first through-hole 203 improves the aperture rate of the pixel, and the principle thereof is same to the above description, which is not described in detail herein.

Figure 4A:
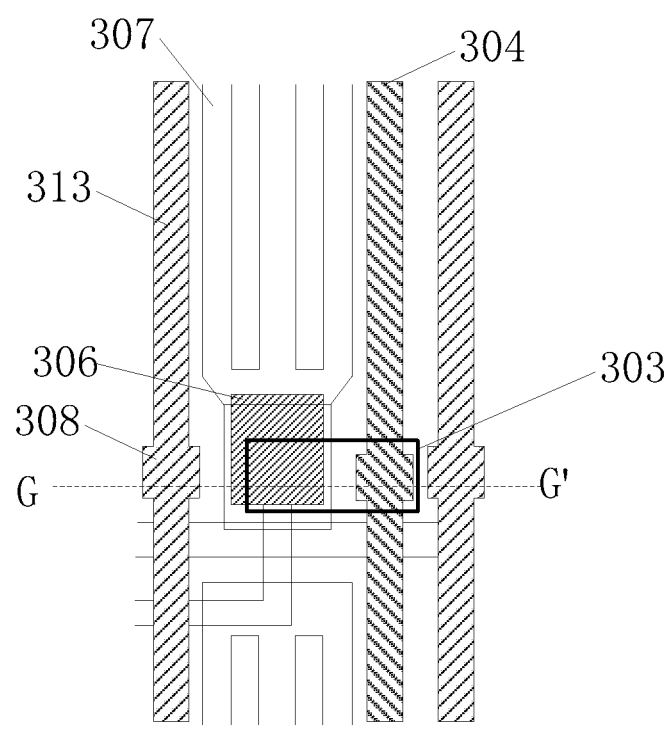
FIG. 4A is a schematic view of an array substrate according to still another embodiment of the present disclosure.
Figure 4B:
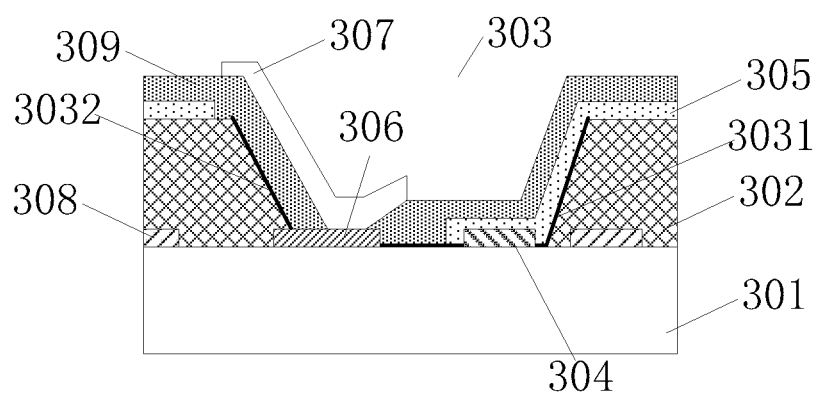
FIG. 4B is a section view of FIG. 4A taken along line G-G'.

FIG. 4A is still another embodiment of the present disclosure provides an array substrate, FIG. 4B is a section view of FIG. 4A taken along line G-G', in the present embodiment, the aperture rate of the pixel can be increased.

As shown in FIG. 4A, the present embodiment provides an array substrate, the array substrate includes: a substrate 301; a first insulation layer 302 disposed on the substrate 301, where the first insulation layer 302 is provided with at least one first through-hole 303 therein, and the at least one first through-hole 303 runs through the first insulation layer 302; a plurality of touch lines 304 located at the bottom of the first through-hole 303; a plurality of touch electrode blocks 305 disposed on the first insulation layer 302, at least one of the plurality of touch lines 304 corresponds to one touch electrode block 305, and the touch electrode block 305 is electrically connected to the corresponding at least one touch line 304; a drain electrode 306 disposed at the bottom of the first through-hole 303, where the drain electrode 306 is insulated from the touch lines 304; a plurality of pixel electrodes 307 disposed above the first insulation layer 302, where the pixel electrode 307 is electrically connected to the drain electrode 306.

In the present embodiment, the substrate 301 is a glass substrate, and the first insulation layer 302 is an organic film layer. However, in the present embodiment, only one first through-hole 303 is provided in the first insulation layer 202 in the drawings.

In the present embodiment, the touch electrode layer is form of the plurality of touch electrode blocks 305 arranged in a matrix manner. Each touch electrode block 305 is electrically connected to the corresponding touch connection portion 304 through the first through-hole 303, and the touch connection portion 304 is used to provide touch signals to the corresponding touch electrode block 305.

A drain electrode 306 is provided at the bottom of the first through-hole 303, and the drain electrode 306 and the touch line 304 commonly share one through-hole and are arranged to be insulated from each other. The pixel electrodes 307 are arranged above the first insulation layer 302 and are electrically connected to the drain electrode 306 through the first through-hole 303. The drain electrode 306 is used to provide display signals to the pixel electrodes 307. In a process for manufacturing the array substrate, the drain electrode 306 is arranged in the same layer with the touch line 304 and is formed by an etching method, the process for manufacturing the drain electrode 306 and the touch lines 304 is not defined herein.

As shown in FIG. 4B, a source electrode 308 which is arranged in the same layer with the drain electrode 306 is also provided below the first insulation layer 302, the source electrode 308, the drain electrode 306 and a gate electrode (not shown) constitute a thin film transistor, the pixel electrodes 307 and the thin film transistor constitute a pixel unit, the source electrode 308 is electrically connected to data line 313, and the pixel electrode 307 receives display signals through the source electrode 308.

In some embodiment, the aperture of the first through-hole 303 can be varied according to different cases. When the touch electrode blocks 305 are needed to be electrically connected to the corresponding touch lines 304, the drain electrode 306 and the touch lines 304 are exposed from the bottom of the first through-hole 303, so that the aperture of the first through-hole 303 as shown is large. When the touch electrode blocks are not needed to be electrically connected to the touch lines, only the aperture of the first through-hole at this location is decreased and only the drain electrode is exposed from the bottom of the first through-hole. Or when the touch electrode blocks are not needed to be electrically connected to the touch lines, the aperture of the first through-hole is not changed, instead, the touch lines located at the corresponding location are configured to bypass the first through-hole, thereby not increasing manufacturing difficulty.

In the array substrate provided according to the present embodiment, the first insulation layer 302 is provided with the first through-hole 303 therein, the touch connection portion 304 and the drain electrode 306 are disposed at the bottom of the first through-hole 303, the touch electrode blocks 305 are electrically connected to the corresponding touch lines 304 through the first through-hole 303, the pixel electrodes 307 are electrically connected to the drain electrode 306 through the first through-hole 303. As a result, in the present embodiment, the touch lines 304 and the drain electrode 306 commonly share one through-hole 303. As compared with the related art, the number of the through-holes and the apertures of the through-holes are both reduced in the present disclosure, so that the alignment disordered region of the liquid crystal molecules caused by the through-hole is decreased, and hence the corresponding dimension of the black matrix is decreased, thereby increasing the aperture rate of the pixel. The manufacturing process for the array in the present embodiment is the same to that in the related art, so that the difficulty for the process is not increased.

On the basis of the above the technical solution, as shown in FIG. 4B, touch electrode blocks 305 extend to the bottom of the first through-hole 303 along a first sidewall 3031 of the first through-hole 303 and are electrically connected to the corresponding at least one touch lines 304. A vertical distance between other touch electrode blocks 305 in a touch electrode layer and the touch lines 304 is increased. As compared with the related art, the distance between the touch electrode blocks 305 and the touch lines 304 is increased, and accordingly the parasitic capacitance generated between the touch electrode blocks 305 and the touch lines 304 is reduced.

On the basis of the above the technical solution, as shown in FIG. 4B, the array substrate includes a second insulation layer 309 disposed between the first insulation layer 302 and the pixel electrodes 307, where the second insulation layer 309 is configured to cover a second sidewall 3032 of the first through-hole 303 and expose the drain electrode 306, and the pixel electrodes 307 extend to the bottom of the first through-hole 303 along the second insulation layer 309 covering the second sidewall 2032 so as to be electrically connected to the drain electrode 306.

In the present embodiment, the second insulation layer 309 is an inorganic film layer. However, in the present embodiment, the material of the second insulation layer is not defined herein. The touch electrode blocks 305 are arranged in a matrix manner, and the pixel electrode 307 is insulated from the touch electrode blocks 305. As a result, the pixel electrode 307 is insulated from the touch electrode blocks 305 by arranging the second insulation layer 309 on the first insulation layer 302.

On the basis of the above the technical solution, as shown in FIG. 4B, the second insulation layer 309 covers the touch electrode block 305 extending along the first sidewall 3031. The drain electrode 306 is insulated from the touch lines 304. As result, the second insulation layer 309 covers the touch electrode blocks 305 extending along the first sidewall 3031 of the first through-hole 303 so as to insulate the drain electrode 306 from the touch lines 304.

On the basis of the above the technical solution, as shown in FIG. 4B, the array substrate further includes: the touch electrode blocks 205 are multiplexed as a common electrode block. In a touch period, the touch lines 304 provide touch signals to the corresponding touch electrode blocks 305. In a display period, the touch lines 304 provide display signals to the corresponding touch electrode blocks 305, the source electrode 308 provides the display signals to the pixel electrodes 307, and an electrical field is generated between the touch electrode blocks 305 and the pixel electrodes 307 to control the deflection direction of the liquid crystal molecules.

Figure 4C:
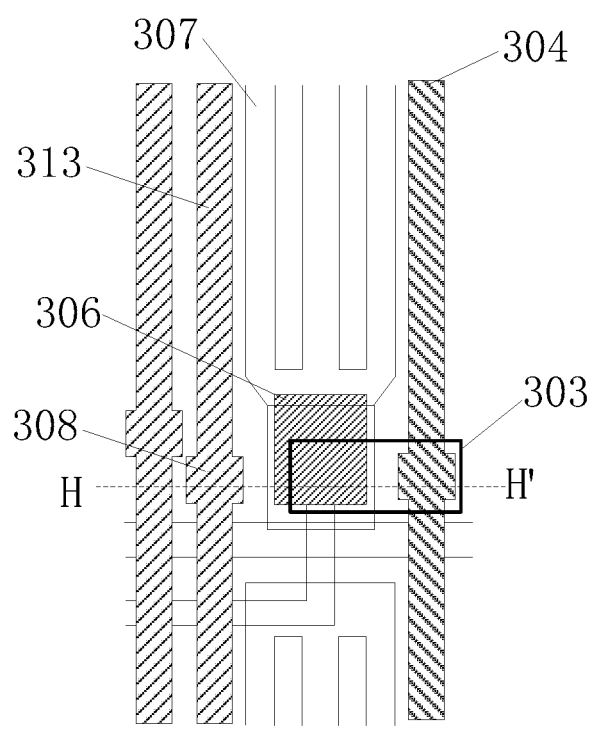
FIG. 4C is a schematic view of another array substrate according to still another embodiment of the present disclosure.
Figure 4D:
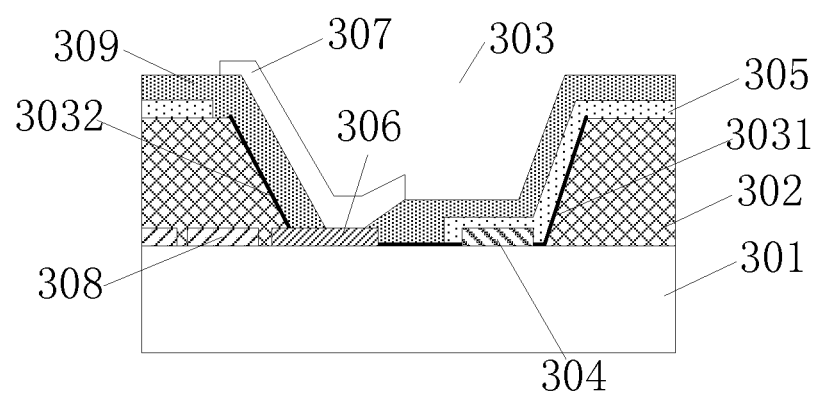
FIG. 4D is a section view of FIG. 4C taken along line H-H'.

The present embodiment also provides an array substrate as shown in FIGS. 4C to 4D. Where FIG. 4D is a section view of FIG. 4C taken along line H-H'. The array substrate employs an arrangement manner in which the touch lines 304 are staggered from the source electrode 308.

The source electrode 308 is arranged in the same layer with the touch lines 304, and the drain electrode is arranged between the source electrode 308 and the touch lines 304. As compared with the related art, the distance between the source electrode 308 and the touch lines 304 is increased. The arrangement of the first through-hole improves the aperture rate of the pixel, and the principle thereof is same to the above description, which is not described in detail herein.

It should be noted that In the present embodiment provided by the present disclosure, a Low Temperature Poly Silicon (LTPS) substrate is used as an example for description. The present disclosure is also suitable for an amorphous silicon a-Si substrate, a metallic oxide IGTO substrate or other substrate, which is not defined in the present disclosure.

Although some embodiments and the applied technology principles of the present disclosure have been described as above, it should be understood that the present disclosure is not limited to particular embodiments described herein. Various modifications, readjustment and alternations can be made without departing the scope of protection of the present disclosure, and these modifications, readjustment and alternations fall within the scope of the present disclosure which is subject to the appended claims.

The invention claimed is:

1. An array substrate, comprising:
a substrate;

a first insulation layer disposed on the substrate, wherein the first insulation layer comprises a first through-hole and the first through-hole runs through the first insulation layer;

a drain electrode at a bottom of the first through-hole;

a touch line at the bottom of the first through-hole, wherein the touch line is insulated from the drain electrode;

a touch electrode block having a first portion on the first insulation layer and a second portion, wherein the second portion of the touch electrode block is extended along a first sidewall of the first through-hole to the bottom of the first through-hole, and the second portion of the touch electrode block is electrically connected to the touch line;

a pixel electrode having a first portion above the first insulation layer and a second portion; and a second insulation layer arranged between the first insulation layer and the pixel electrode, wherein the second insulation layer directly covers a second sidewall of the first through-hole, the second portion of the pixel electrode is extended along the second insulation layer to the bottom of the first through-hole, and the second portion of the pixel electrode is electrically connected to the drain electrode.

2. The array substrate of claim 1, wherein the second portion of the touch electrode block directly contacts the touch line.

3. The array substrate of claim 1, wherein the second insulation layer covers the second portion of the touch electrode block.

4. The array substrate of claim 1, wherein touch electrode block is multiplexed as a common electrode block.

5. An array substrate, comprising:

a substrate;

a first insulation layer disposed on the substrate, wherein the first insulation layer comprises a first through-hole and the first through-hole runs through the first insulation layer;

a drain electrode at a bottom of the first through-hole;

a touch line under the bottom of the first through-hole, wherein the touch line is insulated from the drain electrode;

a touch electrode block having a first portion on the first insulation layer and a second portion, wherein the second portion of the touch electrode block is extended along a first sidewall of the first through-hole to the bottom of the first through-hole, and the second portion of the touch electrode block is electrically connected to the touch line;

a pixel electrode having a first portion above the first insulation layer and a second portion; and a second insulation layer arranged between the first insulation layer and the pixel electrode, wherein the second insulation layer directly covers a second sidewall of the first through-hole, the second portion of the pixel electrode is extended along the second insulation layer to the bottom of the first through-hole, and the second portion of the pixel electrode is electrically connected to the drain electrode.

6. The array substrate of claim 5, wherein the array substrate further comprises a third insulation layer and a touch connection portion, the third insulation layer covers the touch line and has a second through-hole exposing the touch line, the touch connection portion is arranged in the second through-hole and electrically connected to the touch line and the touch electrode block.

7. The array substrate of claim 6, wherein the first insulation layer is an organic film, and a thickness of the organic film is larger than a thickness of the third insulation layer in a direction perpendicular to the substrate.

8. The array substrate of claim 5, wherein the second insulation layer covers the second portion of the touch electrode block.

9. The array substrate of claim 5, wherein touch electrode block is multiplexed as a common electrode block.

* * * * *